United States Patent
Chan

(10) Patent No.: US 7,514,390 B2
(45) Date of Patent: Apr. 7, 2009

(54) METHOD FOR REMOVING FILTER CAKE FROM A HORIZONTAL WELLBORE USING ACID FOAM

(75) Inventor: Albert F. Chan, Plano, TX (US)

(73) Assignee: ConocoPhillips Company, Houston, TX (US)

( * ) Notice: Subject to any disclaimer, the term of this patent is extended or adjusted under 35 U.S.C. 154(b) by 480 days.

(21) Appl. No.: 11/025,883

(22) Filed: Dec. 28, 2004

(65) Prior Publication Data

US 2006/0137879 A1 Jun. 29, 2006

(51) Int. Cl.
*E21B 37/08* (2006.01)

(52) U.S. Cl. .................. 507/202; 507/205; 507/240; 507/241; 507/244; 507/261; 507/265; 507/266; 507/267; 507/269; 166/307; 166/309; 166/312

(58) Field of Classification Search .................. None
See application file for complete search history.

(56) References Cited

U.S. PATENT DOCUMENTS

| | | | |
|---|---|---|---|
| 4,985,154 A | 1/1991 | Balzer et al. | |
| 5,627,144 A * | 5/1997 | Urfer et al. | 507/211 |
| 5,716,910 A * | 2/1998 | Totten et al. | 507/102 |
| 5,725,470 A | 3/1998 | Lazarowitz et al. | |
| 5,830,831 A | 11/1998 | Chan et al. | |
| 5,874,386 A | 2/1999 | Chan et al. | |
| 5,977,032 A | 11/1999 | Chan | |
| 6,000,412 A | 12/1999 | Chan et al. | |
| 6,063,738 A * | 5/2000 | Chatterji et al. | 507/269 |
| 6,090,754 A | 7/2000 | Chan et al. | |
| 6,112,814 A | 9/2000 | Chan et al. | |
| 6,303,556 B1 * | 10/2001 | Kott et al. | 510/357 |
| 6,342,473 B1 * | 1/2002 | Kott et al. | 510/357 |
| 6,613,720 B1 * | 9/2003 | Feraud et al. | 507/200 |
| 6,668,927 B1 * | 12/2003 | Chatterji et al. | 166/291 |
| 7,202,200 B1 * | 4/2007 | DeLeo et al. | 510/191 |

* cited by examiner

*Primary Examiner*—Randy Gulakowski
*Assistant Examiner*—John J Figueroa
(74) *Attorney, Agent, or Firm*—Ryan N. Cross

(57) ABSTRACT

A composition and method for removing a filter cake from a horizontal wellbore in a subterranean formation using a composition containing a inorganic or organic acidic material, a cationic fluorocarbon surfactant, an alkyl alcohol, water optionally containing ammonium chloride and at least one of an alkyl polyglycoside and a betaine surfactant to produce a stable foam used to remove filter cake from a horizontal wellbore.

11 Claims, 6 Drawing Sheets

METHOD FOR REMOVING FILTER CAKE FROM A HORIZONTAL WELLBORE USING ACID FOAM

FIELD OF THE INVENTION

This invention relates to a composition and a method for removing a filter cake from a horizontal wellbore in a subterranean formation using a composition comprising acidic material, a cationic fluorocarbon surfactant, an alkyl alcohol, and at least one of a betaine surfactant and an alkyl polyglycoside, which produces a stable acid foam effective to remove a filter cake from a horizontal wellbore.

BACKGROUND OF THE INVENTION

The use of alkyl polyglycoside formulations for various cleaning operations in wellbores is well known to those skilled in the art and is disclosed in U.S. Pat. No. 5,977,032 issued Nov. 2, 1999 to Albert F. Chan, U.S. Pat. No. 5,830,831 issued Nov. 3, 1998 to Albert F. Chan and Kieu, T. Ly, U.S. Pat. No. 5,874,386 issued Feb. 23, 1999 to Albert F. Chan, William Mark Bohon, David J. Blumer, and Kieu T. Ly, U.S. Pat. No. 6,000,412 issued Dec. 14, 1999 to Albert F. Chan, William Mark Bohon, David J. Blumer, Kieu T. Ly, and William G. McLelland, U.S. Pat. No. 6,112,814 issued Sep. 5, 2000 to Albert F. Chan, William Mark Bohon, David J. Blumer and Kieu T. Ly, and U.S. Pat. No. 6,090,754 issued Jul. 18, 2000 to Albert F. Chan and Kieu T. Ly. These patents are hereby incorporated in their entirety by reference. Other patents that disclose the use of alkyl polyglycosides are U.S. Pat. No. 4,985,154 issued Jan. 15, 1991 to Dieter Balzer and Harald Lueders and U.S. Pat. No. 5,725,470 issued Mar. 10, 1998 to Virginia L. Lazarowitz, Allen D. Urfer and George A. Smith. These patents are hereby incorporated in their entirety by reference.

The use of an aqueous liquid alkyl polyglycoside formulation for cleaning wellbores and the like has been well known and is disclosed for various applications in the patents referred to above. While such formulations have been effective for removal of contaminants from an annulus between a casing and a wellbore and the like, they have not been used to clean filter cakes, such as drill-in-fluid filter cakes, from horizontal wellbores.

Water-based drill-in-fluids, herein drill-in-fluids, are frequently used in the completion of horizontal wells to produce more easily removable filter cakes on the inside of a wellbore penetrating productive areas of a formation. Typically the primary drilling mud includes materials well known to the art, such as bentonite clays, barite, polymers, such as xanthan gum, starch and the like. These primary drilling fluids produce filter cakes which function to reduce fluid loss from the wellbore during drilling. Drill-in-fluids are substituted for primary drilling fluids for drilling through the productive formation(s) in open-hole horizontal wells. Drill-in-fluids typically contain polymers, such as xanthan gum, starch, sized salt bridging particles, such as sized calcium carbonate or sodium chloride particles. Other materials may be included, but the primary ingredients are as listed above. Different sized inorganic salt particles may be used.

During typical drilling operations for horizontal open-hole well completions, primary drilling muds are used to drill to a depth near the top of a producing formation(s). At this point, the primary drilling mud is switched to a drill-in-fluid that displaces the primary drilling fluid from the wellbore and is thereafter used as a drilling fluid for drilling the wellbore through the producing formation(s). Both the primary drilling mud and the drill-in-fluid create filter cakes on the inside of the wellbore as filtrate from the drilling mud or the drill-in-fluid escape into the formation through the inside diameter of the wellbore. These filter cakes serve to stop the loss of fluids during drilling. Unfortunately the filter cake, once formed, also restricts fluid flow from the formation during production.

The drill-in-fluid produces a filter cake on the inside of the fluid-producing zone, which is designed for easier removal by breaker treatments using acid, oxidizer or enzyme materials. An acid breaker treatment can constitute simply positioning an aqueous inorganic acid, such as hydrochloric acid, or an aqueous organic acid, such as formic acid, in the production zone and maintaining it in place in the production zone for a period of time in order to react with drill-in-fluid filter cake components, although this is rarely achieved in a horizontal well. These filter cake masses, as mentioned previously, include materials such as starch and calcium carbonate particles, which are readily dissolved by aqueous acids. The residual filter cake is then sloughed off the inside of the wellbore or removed from the inside of the wellbore by production.

As the horizontal section of a horizontal well is drilled with drill-in-fluid, a much more extended wellbore portion is drilled in the producing zone. For instance, the horizontal portion of the well may be up to a few thousand feet or longer. As a result, the recirculated drill-in-fluid becomes contaminated with drilled cuttings from the formation. As the drill-in-fluid becomes more contaminated, the filter cake formed becomes more difficult to remove by a breaker treatment, even with a strong acid treatment. This difficulty is a result of the presence of additional acid insoluble formation cuttings or fines from the formation in the drill-in-fluid in addition to the calcium carbonate sized salt, starch and other components of the drill-in-fluid. The presence of the drilled solids also affects the dissolution or removal rate of the filter cake masses, as some can be removed much slower than others due to blockage of access by the drilled solids on the filter cake surfaces. The result of non-uniform dissolution of some filter cake masses will prematurely open the communications with the formation and subsequently induces a total loss of acid treatment fluid. This is most undesirable because the loss of acid treatment fluid will leave a significant portion of the filter cake mass intact on the formation surface which will continue to inhibit the flow of fluid during production.

As the lateral section of the well is drilled, the contamination of the drill-in-fluid by the formation solids increases. Solids control equipment on the surface can help remove some of the drilled solids and mitigate the problem, but it is not a practical solution since smaller drill solids and fines can be very difficult to remove using such solids control equipment. Accordingly, the filter cake formed on the inside near inlet (heel) surfaces of the horizontal wellbore is substantially clean filter cake of drill-in-fluid constituents. However the filter cake may contain substantial quantities of formation solids toward the end (toe) of the horizontal wellbore. As a result, when acid treatment is used by simply placing an aqueous acid in the horizontal portion of the wellbore, the relatively clean drill-in-fluid filter cake at the heel of the horizontal wellbore can be broken up quickly.

Those filter cakes containing quantities of formation fines in increasing percentages along the length of the horizontal wellbore toward its toe result in increasingly slower removal of the filter cake along the length of the horizontal wellbore. As a result, the aqueous acid solution is lost into the formation through the heel of the horizontal wellbore as the filter cake is destroyed and removed faster than the filter cake near the toe. The result is that the filter cake is effectively removed, at least in part, near the heel of the horizontal wellbore but little effect is seen in the extended portions of the horizontal wellbore beyond the near heel portion. The unremoved or unbroken filter cake will inhibit the flow of fluids during production Attempts to remove such filter cakes more uniformly along the length of the horizontal portion of horizontal wellbores have been made using slower-acting breakers, such as enzymes, oxidizing agents and the like, which are considered to break down the starch. While such techniques have been somewhat successful, they are very slow and typically require from 36 to 48 hours or longer to be effective and also may require difficult, special handling at the surface. Accordingly, an improved method for treating horizontal wellbores to remove filter cakes has been sought.

SUMMARY OF THE INVENTION

According to the present invention, such drill-in-fluid filter cakes are removed by: forming an aqueous acidic foam which is stable at 200° F. for at least about 3 to about 4 hours which comprises an aqueous acidic material selected from the group consisting of from about 1 to about 20 weight percent of an inorganic acid and from about 1 to about 30 weight percent of an organic acid and mixtures thereof; about 0.05 to about 3 weight percent of a cationic fluorocarbon surfactant; from about 0.1 to about 4 weight percent of an alkyl alcohol containing from about 4 to about 8 carbon atoms; at least one of about 0.1 to about 4 weight percent of a betaine surfactant and about 0.25 to about 10 weight percent of an alkyl polyglycoside containing alkyl groups containing from about 8 to about 16 carbon atoms and mixtures thereof; and, water optionally containing ammonium chloride; positioning the aqueous acidic foam in the horizontal wellbore; and, retaining the aqueous acidic foam in the horizontal wellbore for a time from about 2 to about 4 hours.

The invention further comprises a composition for producing a stable acidic foam for use in removing filter cake from a horizontal wellbore in a subterranean formation, the foam. being stable at 200° F. for at least about 3 to about 4 hours, the composition comprising: an acidic material selected from the group consisting of from about 1 to about 20 weight percent of an inorganic acid and from about 1 to about 30 weight percent of an organic acid and mixtures thereof; about 0.05 to about 3 weight percent of a cationic fluorocarbon surfactant; from about 0.1 to about 4 weight percent of an alkyl alcohol containing from about 4 to about 8 carbon atoms; and, about 0.25 to about 10 weight percent of an alkyl polyglycoside containing alkyl groups containing from about 8 to about 16 carbon atoms and mixtures thereof; and, water optionally containing ammonium chloride.

DESCRIPTION OF THE PREFERRED EMBODIMENTS

Figure 1:
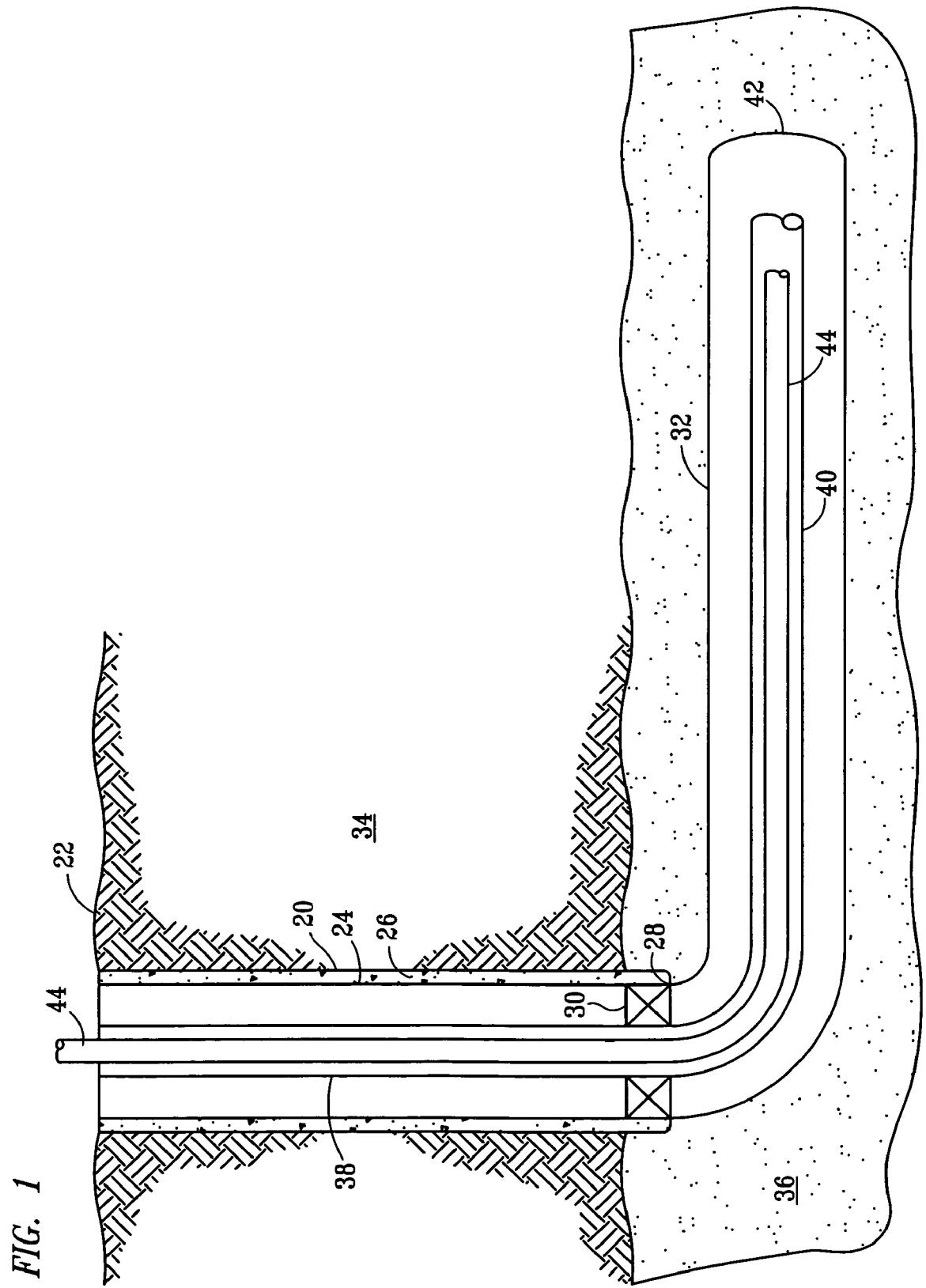
FIG. 1 is a schematic diagram of a horizontal wellbore suitable for treatment by the method and composition of the present invention.

In the description of the Figures, various pumps, valves and the like, as known to the art, which are necessary to achieve the flows described have not been shown in the interest of conciseness. All concentrations are by weight percent of active ingredient in the aqueous solution or the aqueous foam unless otherwise stated.

The surfactant foam composition of the present invention consists essentially of an aqueous foam containing an aqueous acidic material selected from the group consisting of from about 1 to about 20, and preferably from about 3 to about 10, weight percent of an inorganic acid such as hydrochloric acid; from about 1 to about 30, and preferably from about 5 to about 20, weight percent, of an organic acid selected from a group consisting of formic, acetic, propionic and citric acids; from about 0.05 to about 3, preferably about 0.1 to about 0.5, weight percent of a cationic fluorocarbon surfactant; from about 0.1 to about 4 weight percent and preferably from about 0.1 to about 2 weight percent of an alkyl alcohol containing from about 4 to about 8 carbon atoms; at least one of from about 0.1 to about 4, and preferably from about 0.5 to about 2.0 weight percent of a betaine surfactant; and about 0.25 to about 10, and preferably from about 0.5 to about 2 weight percent of at least one alkyl polyglycoside surfactant selected from alkyl polyglycosides containing alkyl groups containing from about 8 to about 16 carbon atoms and mixtures thereof. Preferably, the alkyl polyglycoside, betaine surfactant and cationic fluorocarbon surfactant comprise from about 0.5 to about 6 weight percent of the aqueous foam.

The acid material may be either hydrochloric acid, an organic acid, a mixture of organic acids or mixtures thereof. The acid is typically added as a concentrated aqueous solution. The acid material is a necessary component of the surfactant composition since it is required to effectively decompose the starch cementing materials and sized salt bridging particles. Especially with carbonate particulates, the acid is effective to dissolve the particulates.

The alkyl alcohol may be a linear or a branched alkyl alcohol and is desirably present in an amount from about 0.1 to about 2 weight percent. The alcohol promotes the formation of microemulsions once the surfactant foam has been spent and becomes mixed with oily fluids, such as crude oil and condensate from the formation.

The composition further desirably comprises an amphoteric surfactant that contains a fatty acid amido alkyl chain, a positive quaternary ammonium group and a negative carboxylate group, such as a betaine surfactant. The fatty acid group desirably contains from about 14 to 24 carbon atoms and preferably from about 16 to about 20 carbon atoms. The alkyl chain contains from about 2 to about 4 carbon atoms and preferably 3 carbon atoms.

Cocoamido propyl betaine is a preferred betaine surfactant containing a cocoamido propyl group. The betaine surfactant is present in a quantity from about 0.1 to about 4, and preferably is present in an amount from about 0.5 to about 2 weight percent. The cocamido propyl betaine used was FORAMOUSSE S1. FORAMOUSSE S1 betaine surfactant is marketed by Seppic, Inc. of Fairfield, N.J.

The foam formulation also includes from about 0.05 to about 3 weight percent of a cationic fluorocarbon surfactant.

Suitable cationic fluorocarbon surfactants are selected from the group consisting of fluorinated alkyl quaternary ammonium halides. The surfactant consists of an insoluble fluorocarbon "tail" and a water-soluble solubilizing group. The fluorocarbon tail should contain 4 to 8 carbon chain which is fluorinated, and the solubilizing group is chloride or iodide. Such a material is marketed as FLUORAD FC 754 (trademark of 3M Company of St. Paul, Minn.). These materials are useful as a component in a composition to generate a foam which remains is stable at 200° F. for at least about 3 to about 4 hours in a formation. The foam is stable up to a crude oil content of at least 30 volume percent.

Typically water containing ammonium chloride is present in an amount up to about 6 weight percent ammonia chloride or more. Preferably the ammonium chloride is present in an amount from about 2 to about 6 weight percent Representative drill-in-fluids have been discussed and are disclosed more fully in DRIL-N Specialized Systems For Optimum Production Brochure, by Baroid Drilling Fluids, Inc. Such systems are described in this brochure and are considered to be well known to those skilled in the art. DRIL-N is a trademark of Baroid Drilling Fluids, Inc.

These drill-in-fluids, as indicated previously, are used to drill the wellbore through producing zones of a formation. In the course of drilling a wellbore, the drill-in-fluid is used in the producing intervals so that drill-in-fluid filter cakes are deposited on the walls of the wellbore as the aqueous portion of the drill-in-fluids leaks off into the formation as a filtrate. The removal of these drill-in-fluid filter cakes is more easily accomplished than is the removal of filter cakes of the primary drilling fluid.

The composition described above is most effectively used by displacing it into a horizontal wellbore as a foam and maintaining it in position in the horizontal wellbore for a period of time up to about 2 to about 4 hours.

The composition is readily produced by mixture of the component parts with an aqueous liquid. The foam may be formed by the use of alternating slugs of gas, such as air, nitrogen or the like, and the composition or a foam generation nozzle or the like in the horizontal wellbore, but is preferably formed at the surface and injected via a tubing or the like.

Oil wells are typically completed in a number of ways. In the first type of completion, the well is drilled generally vertically to and through an oil-producing zone, thereafter cased with pipe and then perforated in the oil-producing zone. This results in producing a flow channel (perforation) through the casing and the cement sheath between the outside of the casing and the wellbore so that oil can flow freely from the formation through the perforation holes. Unfortunately, the perforation openings are not large relative to the area of the casing or the area of the inside of the wellbore. Nevertheless, such completions have been practiced widely.

In another type of completion, the well may be completed by drilling to, or near the top of an oil-bearing formation, casing the well to near the top of the oil-bearing formation and then drilling horizontally from the vertical wellbore through the oil-bearing formation. A drill-in-fluid is used to drill through the oil-bearing formation.

Drill-in-fluids have been previously described and generally comprise bridging particulates, such as calcium carbonate or sodium chloride sized salts, in combination with starch, a polymer such as xanthan and the like. The drill-in-fluid filter cakes are more readily removed from the inside of the wellbore by aqueous acid than are filter cakes produced by the primary drilling muds.

If the well is to be completed as a horizontal open-hole, it is desirable that the filter cake be removed from the face of the formation around the lateral portion of the wellbore prior to production. In other words, the filter cakes as deposited by both the typical drilling fluid and the drill-in-fluid are positioned on the face of the formation as a result of the escape of filtrate into the formation, leaving the starchy and particulate constituents of the filter cake on the face of the formation. Drilling fluids achieve shut off of liquid flow into the formation during drilling, thereby preventing fluid loss from the wellbore during drilling. This is a desirable feature during drilling but is highly undesirable when the same filter cake serves to prevent the flow of fluids from the oil-bearing formation into the wellbore. The use of drill-in-fluids is practiced by substituting the drill-in-fluid for the primary drilling fluid when a desired depth is reached so that the drill-in-fluid displaces the conventional drilling fluid from the wellbore for drilling through the oil-bearing formation. The filter cake on the face of the oil-bearing formation thus contains the more easily removed sized salt particulates, starch and polymers used in the formulation of drill-in-fluids.

A horizontal well completion is shown schematically in FIG. 1. A wellbore 20 in FIG. 1 extends from a surface 22 through an overburden 34 and generally horizontally in an oil-bearing formation 36. Wellbore 20 comprises a casing 24, which is cemented in place by cement 26 and extends to a bottom 28 of casing 24. A packer 30 is typically placed near the bottom of casing 24 for the completion of the well. A horizontal (lateral) portion 32 of wellbore 20 extends generally horizontally into oil-bearing formation 36. A production tubing 38 extends downwardly through casing 24 and into oil-bearing formation 36. Production tubing 38 may be centralized or it may lie on the bottom of at least a portion of horizontal portion 32. A horizontal section 40 of production tubing 38 may comprise a slotted liner, screen-liner, or the like for oil production after well completion. Desirably, tubing 38 extends to near a toe 42 of the horizontal section. A tube, such as a coiled tubing 44, may be extended downwardly into wellbore 20 through tubing 38 for the injection of the foam. The foam may be produced by generating the foam at the surface and passing it downwardly through tube 38 into horizontal section 32 or the foam may be produced in-situ by injecting slugs of air and the composition alternately through the horizontal wellbore. A variety of well tubing configurations are possible as known to those skilled in the art.

Aqueous acid has been found effective to break a drill-in-fluid filter cake mass. The acid can degrade the starch, which acts as a bonding material, and can dissolve carbonate bridging particles. Once the filter cake is broken, communication between the wellbore and the formation becomes open and allows fluid movement, depending on hydrostatic pressure in the cased hole. Often acid will be lost to the formation once an opening is established after filter cake is broken anywhere in the horizontal hole. One difficulty in filter cake removal is to achieve a uniform break in the filter cake simultaneously across the horizontal hole. This is difficult because the filter cake composition may not be of a uniform composition as deposited across the length of the horizontal portion of the well. Filter cake near the heel tends to have much less drilled solids contaminants due to a cleaner drill-in fluid than filter cake toward the toe, which will have more drilled solid contaminants as a result of the drill-in fluid picking up solids and fines when making the new hole.

A filter cake mass containing more drilled solids has been found to be harder to break, requiring a higher acid concentration and a longer soaking time with the acid. This is possibly due to the hindrance by the drilled solids of the acid to the starch and carbonate material of the filter cake mass and also the reduction of available starch and carbonate materials per unit surface area of the filter cake.

As a result, historically aqueous acid treatment has not been satisfactory in breaking the filter cake across an open hole. In most instance, acid is lost to the formation after a short period of soaking time. It is believed that the acid has broken only the filter cake mass near the heel section and escapes into the formation due to the hydrostatic pressures in the cased hole. Consequently the majority of the filter cake, especially toward and near the toe section, is not broken and therefore will continue to hinder the productivity of the well. Remedial treatment to remove unbroken filter cake near the toe section of the open hole proves to be very difficult since the open hole is no longer able to hold any aqueous liquid fluid since a leak off escape point is already established near the heel section.

Other breaker treatments using enzyme or oxidizing agents have been practiced. However, enzyme treatment is a slow process requiring typically 36-48 hours of soaking time and is very selective with respect to the filter cake components. For example, some enzyme is starch specific while other enzyme is polymer specific. Neither dissolves carbonate bridging particles and both are sensitive to oily contaminates in the wellbore. Enzyme treatment is usually the most costly and time consuming treatment since neither dissolves carbonate bridging particles and both may require a remedial acid pill to dissolve bridging particles to completely remove the filter cake.

Oxidizing agents have also been used in breaker treatments. Such agents function as breakers by attacking the polymer linkage and breaking it into smaller pieces. The use of oxidizing breakers is limited because of the more stringent handling requirements on the surface. Furthermore, the use of a remedial acid pill may also be required to dissolve the bridging particles to completely remove the filter cake.

Both of the referenced techniques have been practiced with their own selective successful results.

According to the present invention, these filter cakes are removed by the injection of acidic foam. The foam may be created at the surface and simply pumped into the horizontal portion of the wellbore or it may be generated by injecting alternating slugs of gas and liquid as the materials are injected or the like. A foam forming head may be used on the injection pipe near toe 42 of horizontal portion 32 and the like. Means for introducing foam into formations are well known to the art. It is also well known to those skilled in the art that foams tend to inhibit the fluid flow and end the loss of fluids into subterranean formation even though some portion of the filter cake mass has been prematurely broken. This allows continued dissolution of the rest of the filter cake along the lateral portion with acidic treatment. Accordingly, even if the acid is more effective to remove filter cake in a given portion of the horizontal wellbore than in other portions of the horizontal wellbore, the fluid loss will be arrested by the presence of the foam in the portions where the acid is more quickly effective.

The foam is stable at formation conditions in the presence of crude oil, i.e., up to at least 200° F. and for times of at least 3 to 4 hours. The foam, as positioned in section 32, will contact the filter cake mass on the formation surfaces of the wellbore in section 32 so that drill-in-fluid filter cake can be removed from these surfaces. The acid foam is effective to remove the drill-in-fluid filter cake containing calcium carbonate particulates, starch and the like. The acid foam is also effective to remove the filter cake by reaction with the starch.

Further, the foam not only remains in contact with most of the surfaces of section 32, but also is effective when an area of filter cake is removed in section 32 to prevent the escape of substantial quantities of foam into the surrounding formation. This has been a recurring problem when substances such as acidic aqueous solutions are used for the removal of drill-in-fluid filter cake. Not only are such acidic solutions more difficult to handle and to maintain in contact with all surfaces but when an area of filter cake is prematurely removed, the whole aqueous acid treatment fluid tends to escape into the formation without restriction. This is not surprising considering that one function of the drill-in-fluid filter cake is the prevention of the escape of fluids. In other words, the drill-in-fluid filter cake serves in certain aspects as a fluid loss control material. These benefits are achieved by using the acidic foam since the foam is stable and tends to block the formation passages temporarily in areas from which the filter cake has been removed.

Accordingly, the foam not only remains in contact with section 32 of the horizontal wellbore for the selected time but also inhibits the escape of liquids from the formation. Further, the acidic foam according to the present invention is tolerant of crude oil. The foam is stable at crude oil concentrations up to at least about 30 weight percent crude oil in the foam. This permits small amounts of oil to seep into section 32 while the foam is in place. Crude oil has been known to provide an anti-foaming effect.

The foam is desirably produced at a foam quality from 70 to 95 percent. This percentage refers to the percent of gas in the foam volume. The foam is readily prepared using air, nitrogen or any other suitable gas.

The higher quality foams will be of a quality of about 80 to about 90 percent. Many types of foam that have been previously proposed for such uses are readily broken by the combination of high temperature and high acid concentrations in the presence of oil. The present foams are not susceptible to breaking at temperatures up to at least 200° F. The foams of the present invention readily tolerate acids up to the limits discussed above and are stable in the presence of up to 30 percent oil in the foam. This permits cleaning of the horizontal portion of the wellbore while retaining foam stability. The spent foam or its constituents are then readily produced from the horizontal wellbore with the produced oil.

In the following examples, it is demonstrated that the foams of the present invention have the required stability at elevated temperatures and are effective to remove drill-in-fluid filter cake and are tolerant to the presence of oil. These advantages, taken with the ability of the foam to restrict the loss of foam from the horizontal wellbore when areas of filter cake have been removed lead to a surprisingly superior and effective method for removing drill-in-fluid filter cake from a horizontal wellbore.

EXAMPLES

Foam Test Procedure in Silicon Oil Bath

Equipment used in the test was: KIMBLE brand 16×150 mm borosilicate glass round bottom tubes with marking spots and corresponding phenolic caps and 10 cc of fluid. The fluid was measured by weight as well as the crude oil, incorporating its density. Up to 20 vials can be tested at the same time.

The vials were filled with 10 cc of fluid, capped and labeled. They were placed into a preheated oil both at 95° C. and left for 20 minutes to heat up. Each vial was taken out of the bath and opened to release pressure buildup and then the caps were re-tightened. The solution was then mixed gently by turning the vials upside down three times (to equilibrate the solution). The vials were returned to the preheated oil for 5 minutes in order to return to the 95° C. temperature. The vials were then again individually vented and recapped. The vials were then placed in a mechanical shaking device and rigorously shaken for 12-13 times before being placed back in the oil bath, at which time a stop watch was started. The foam height was then observed starting at 0 minutes time and at various intervals, depending on foam ability.

Results

The test results show the effects of surfactant composition for FLUORAD FC-754 and FORAMOUSSE S1 or APG 300 in combination on foam stability. The tests in FIGS. 2-5 were run at 95° C. (203° F.) temperature with 10 weight percent hydrochloric acid containing 2 weight percent ammonium chloride in the presence of 30 weight percent crude oil. The tests in FIG. 6 were run at 150° F. (65.5° C.) temperature with 15 weight percent hydrochloric acid containing 2 weight percent ammonium chloride in the presence of 30 weight percent crude oil. FC-754 is FLUORAD FC-754, FS-1 is FORAMOUSSE S1, APG 300 is a $C_9$-$C_{11}$ alkyl polyglycoside with a degree of polymerization number of 1.4, WC-66 is crude oil from the West Cameron 66 field, EI-175 is crude oil from the Eugene Island 175 field and C6OH is n-hexanol. The other abbreviations are standard abbreviations.

Figure 2:
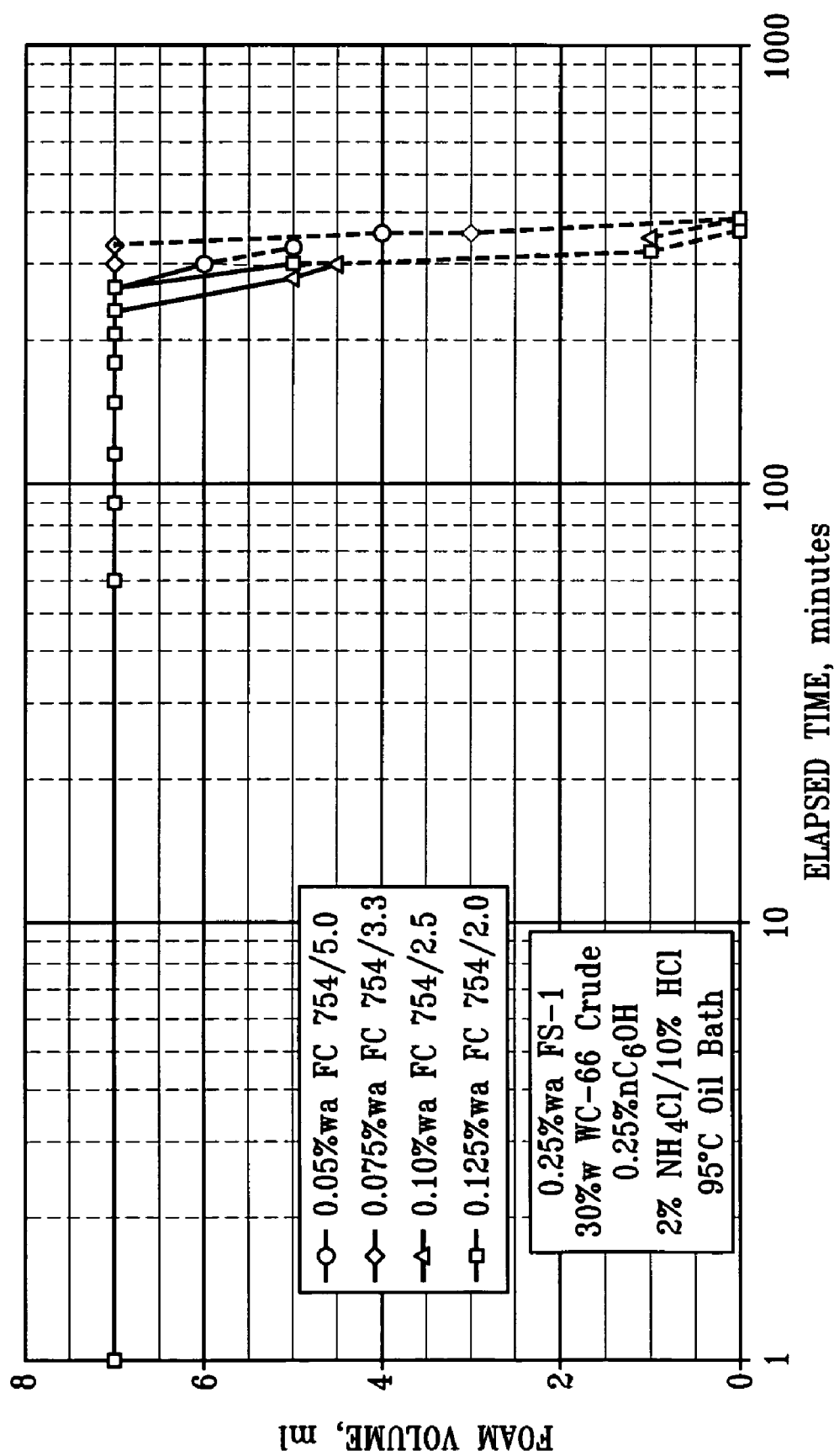
FIG. 2 shows foam stability test results in the presence of 30 weight percent crude oil with 10 weight percent hydrochloric acid in 2 weight percent ammonium chloride brine using 0.25 weight percent n-hexanol and 0.25 weight percent FORAMOUSSE S1 with FLUORAD FC-754 concentrations ranging from 0.05-0.125 weight percent at a temperature of 95° C. (203° F.)

The tests in FIG. 2 were performed at the conditions shown with foams produced using surfactant compositions which contain 0.25 weight percent FS-1 and FC-754 concentrations ranging from 0.05 to 0.125 weight percent with a corresponding surfactant ratio between FS-1 and FC-754 ranging from 5.0 to 2.0. These had the foam stabilities shown.

Figure 3:
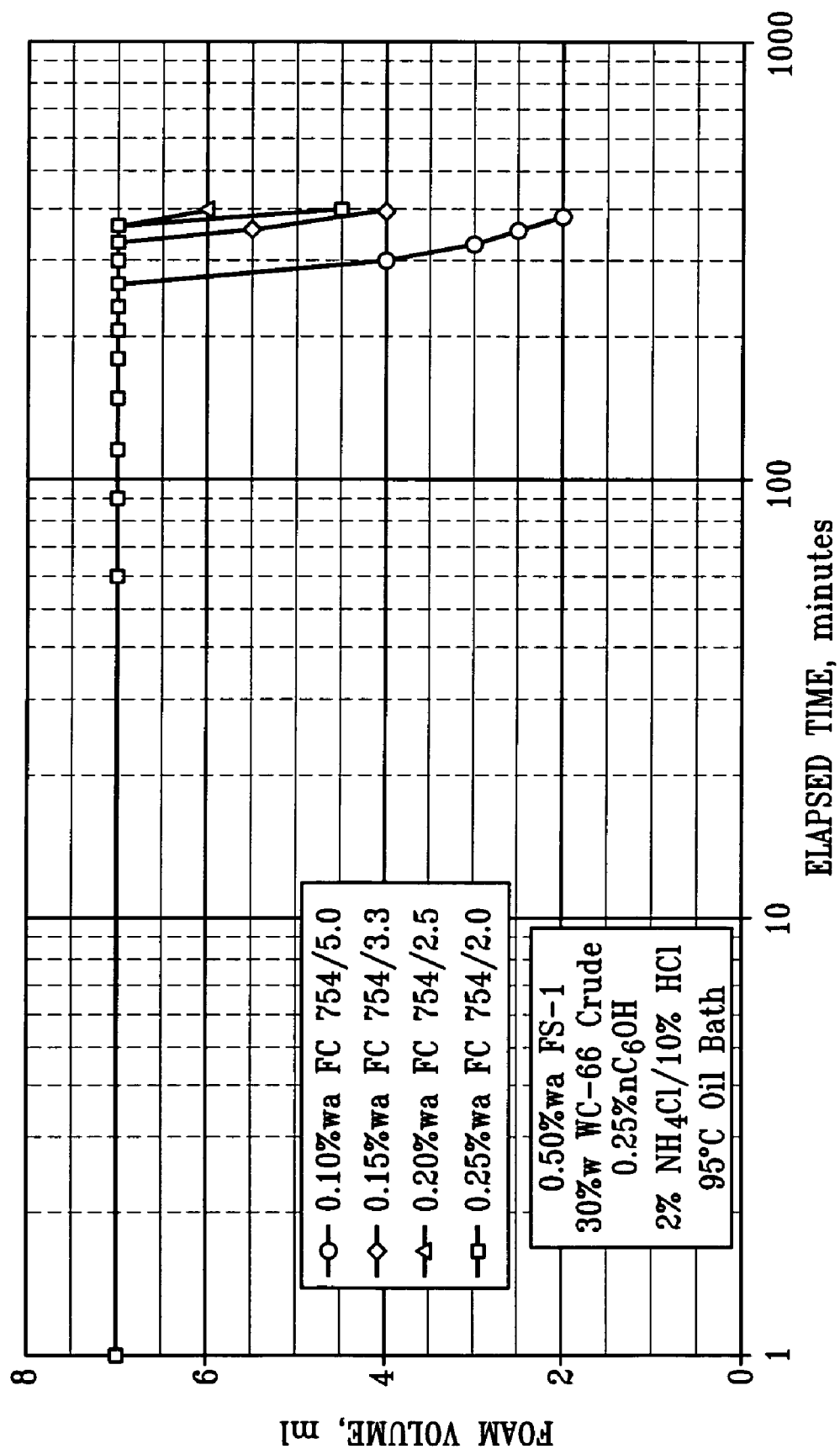
FIG. 3 shows foam stability test results in the presence of 30 weight percent crude oil with 10 weight percent hydrochloric acid in 2 weight percent ammonium chloride brine using 0.25 weight percent n-hexanol and 0.50 weight percent FORAMOUSSE S1 with FLUORAD FC-754 concentrations ranging from 0.10-0.25 weight percent at a temperature of 95° C. (203° F.)

FIG. 3 shows the test results for 0.50 weight percent FS-1 and a higher FC-754 concentrations ranging from 0.10 to 0.25 weight percent in order to keep a similar corresponding ratio between FS-1 and FC-754 from 5.0 to 2.0.

Figure 4:
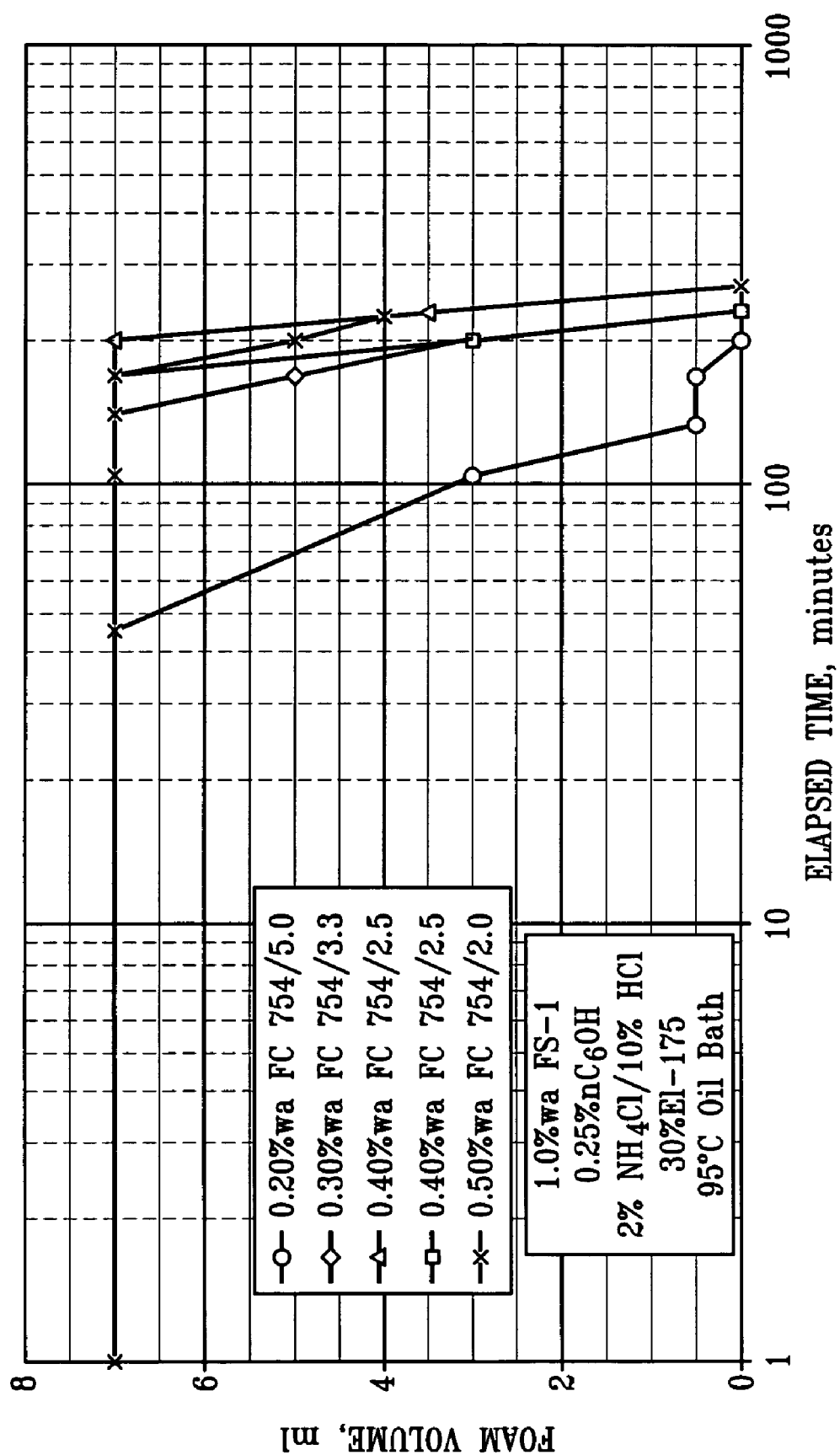
FIG. 4 shows foam stability test results in the presence of 30 weight percent crude oil with 10 weight percent hydrochloric acid in 2 weight percent ammonium chloride brine using 0.25 weight percent n-hexanol and 1.0 weight percent FORAMOUSSE S1 with FLUORAD FC-754 concentrations ranging from 0.20-0.50 weight percent at a temperature of 95° C. (203° F.)

FIG. 4 shows results for tests conducted under substantially the same conditions as those previously shown but with higher concentrations of 1.0 weight percent FS-1 and 0.20 to 0.50 weight percent of FC-754, while keeping a similar corresponding ratio between FS-1 and FC-754 from 5.0 to 2.0. The crude oil was Eugene Island 175 field crude oil.

Figure 5:
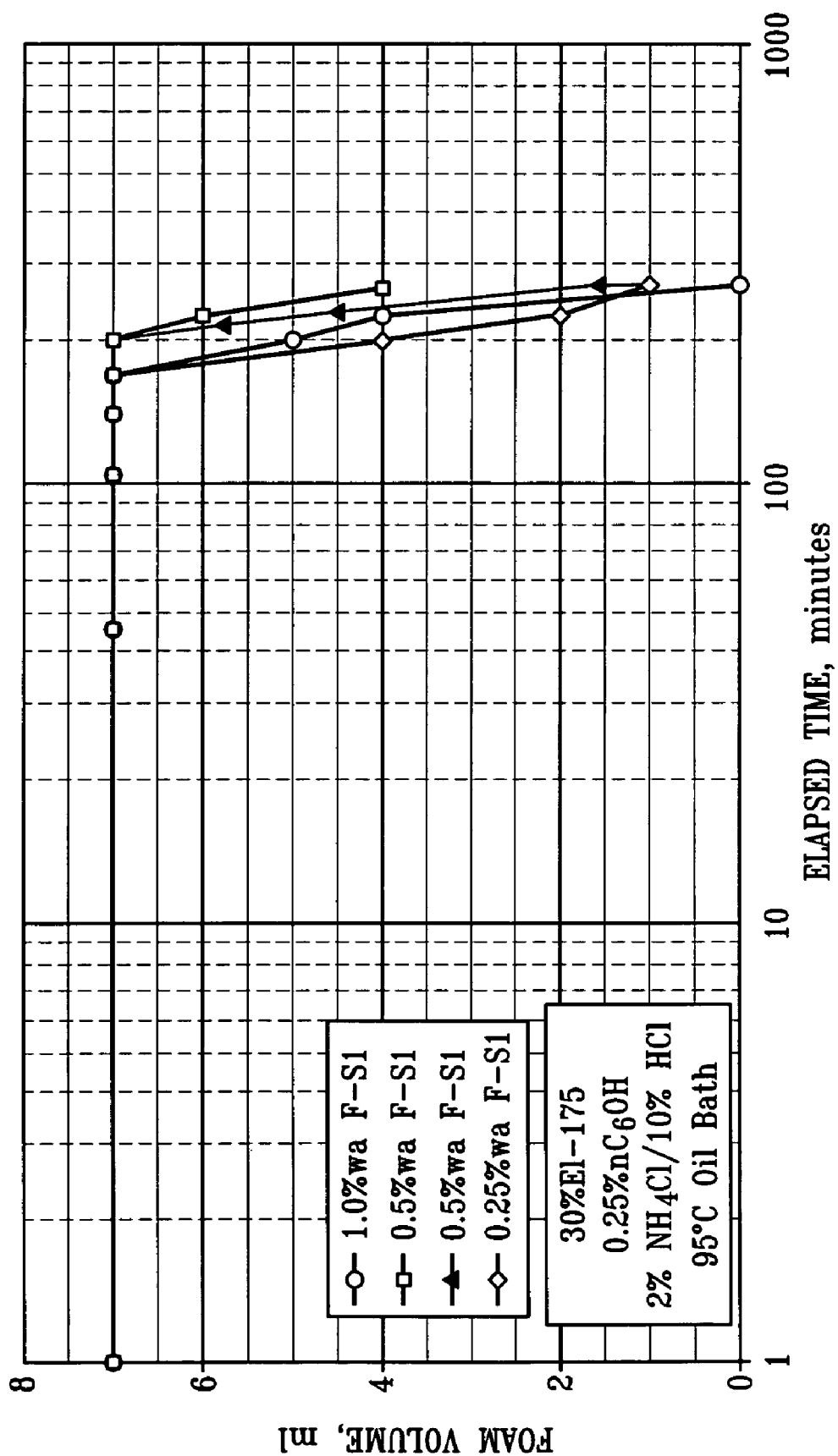
FIG. 5 shows foam stability from tests conducted under substantially the same conditions as those previously shown with 0.25-1.0 weight percent FORAMOUSSE S1, but without FLUORAD FC-754 surfactant component; and, FIG. 6 shows foam stability test results comparing four different formulations in 0 or 15 weight percent hydrochloric acid solution at 150° F. (65.5° C.) in the presence of 30 weight percent crude oil.

FIG. 5 shows foam stability test results under substantially the same conditions as those previously show, using FORAMOUSSE S1 concentration ranging from 0.25 to 1.0 weight percent, but without the addition of FLUORAD FC-754 surfactant.

Figure 6:
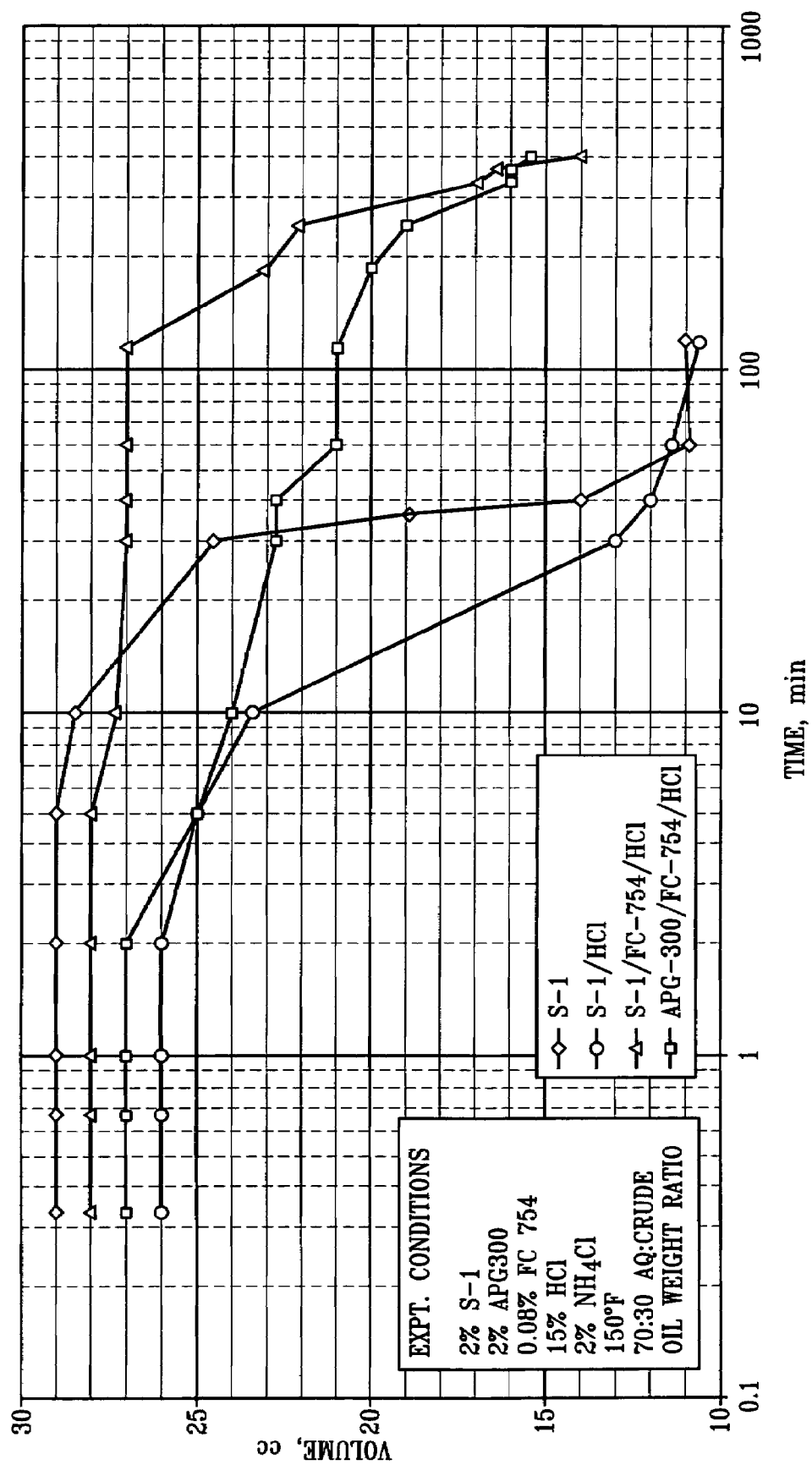

The first two graphs in FIG. 6 provide a comparison of foam stability test results for a 2 weight percent FORAMOUSSE S1 in 0 and 15 weight percent hydrochloric acid. Experimental conditions are as shown and were used with each of the four graphs shown.

In a third graph the FORAMOUSSE S1 was used with FLUORAD FC-754 and 15 weight percent hydrochloric acid at the concentrations shown.

In the fourth graph, alkyl polyglycoside (APG 300) was used in combination with the FLUORAD FC-754 and 15 weight percent hydrochloric acid at the concentrations shown. Clearly the combination of the FORAMOUSSE S1 with the FLUORAD FC-754 has resulted in superior foam, which remained stable for up to 300 minutes. Similarly, the combination of APG 300 with FLUORAD FC-754 has resulted in a foam which has similar stability. Much less stability is obtained using the FORAMOUSSE S1 alone in the presence of 15 weight percent hydrochloric acid.

The test results clearly show that surprisingly stable foams are produced by the use of either the FORAMOUSSE S1 or the alkyl polyglycoside in combination with FLUORAD FC-754.

This surprising superiority permits the use of acid foam, which is shown to be stable in the presence of crude oil, for filter cake removal in a horizontal wellbore.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

That which is claimed is:

1. A composition for producing a stable acidic foam for use in removing filter cake from a horizontal wellbore in a subterranean formation, the foam being stable at 200° F. for at least about 3 to about 4 hours, the composition consisting essentially of:
    a) an acidic material selected from the group consisting of from about 1 to about 20 weight percent of an inorganic acid, from about 1 to about 30 weight percent of an organic acid and mixtures thereof;
    b) about 0.05 to about 3 weight percent of a cationic fluorocarbon co-surfactant;
    c) about 0.1 to about 4 weight percent of an alkyl alcohol containing from about 4 to about 8 carbon atoms;
    d) of about 0.1 to about 4 weight percent of a betaine surfactant and about 0.25 to about 10 weight percent of an alkyl polyglycoside containing alkyl groups containing from about 8 to about 16 carbon atoms and mixtures thereof and;
    e) water optionally containing ammonium chloride.

2. The composition of claim 1 wherein the alkyl polyglycoside is present in an amount from about 0.5 to about 2 weight percent.

3. The composition of claim 1 wherein the composition includes the alkyl alcohol in an amount from about 0.1 to about 2 weight percent.

4. The composition of claim 1 wherein the acidic material is an inorganic acid and wherein the inorganic acid is present in an amount from about 3 to about 10 weight percent.

5. The composition of claim 1 wherein the acidic material is an organic acid and is present in an amount from about 5 to about 20 weight percent.

6. The composition of claim 1 wherein the betaine surfactant is selected from the group consisting of fatty acid amido propyl betaines.

7. The composition of claim 1 wherein the organic acid is selected from the group consisting of formic, acetic, propronic and citric acids and combinations thereof.

8. The composition of claim 1 wherein the cationic surfactant fluorocarbon is selected from the group consisting of fluorinated alkyl quaternary ammonium chlorides.

9. The composition of claim 1 wherein the alkyl alcohol is present in an amount from about 0.1 to about 2 weight percent.

10. The composition of claim 1 wherein the betaine surfactant is cocoamido propyl betaine.

11. The composition of claim 1 wherein the combined amounts of the alkyl polyglycoside, betaine surfactant and cationic fluorocarbon quaternary surfactant are 0.5 to about 6 weight percent of the foam.

* * * * *